United States Patent
Kim et al.

(10) Patent No.: US 9,280,204 B2
(45) Date of Patent: Mar. 8, 2016

(54) METHOD AND APPARATUS FOR TRACKING USER'S GAZE POINT USING MOBILE TERMINAL

(71) Applicants: Electronics and Telecommunications Research Institute, Daejeon (KR); CATHOLIC UNIVERSITY INDUSTRY—ACADEMIC COOPERATION FOUNDATION, Seoul (KR)

(72) Inventors: Soo Chang Kim, Daejeon (KR); Young Hoon Kim, Daejeon (KR); Seung Chan Bang, Daejeon (KR); Hee-Jae Lee, Gimpo-si (KR); Sang-Goog Lee, Anyang-si (KR)

(73) Assignees: ELECTRONICS AND TELECOMMUNICATIONS RESEARCH INSTITUTE, Daejeon (KP); CATHOLIC UNIVERSITY INDUSTRY-ACADEMIC COOPERATION FOUNDATION, Seoul (KR)

( * ) Notice: Subject to any disclaimer, the term of this patent is extended or adjusted under 35 U.S.C. 154(b) by 8 days.

(21) Appl. No.: 14/257,565

(22) Filed: Apr. 21, 2014

(65) Prior Publication Data

US 2014/0313124 A1    Oct. 23, 2014

(30) Foreign Application Priority Data

Apr. 23, 2013 (KR) .......................... 10-2013-0045041

(51) Int. Cl.
  *G06F 3/01* (2006.01)
  *G06F 1/32* (2006.01)
  *G06K 9/00* (2006.01)

(52) U.S. Cl.
  CPC .............. *G06F 3/013* (2013.01); *G06F 1/3231* (2013.01); *G06K 9/00597* (2013.01); *Y02B 60/1289* (2013.01)

(58) Field of Classification Search
  None
  See application file for complete search history.

(56) References Cited

U.S. PATENT DOCUMENTS

| | | | | |
|---|---|---|---|---|
| 7,742,623 | B1 * | 6/2010 | Moon ................ | G06K 9/00604 382/103 |
| 8,660,580 | B2 | 2/2014 | Kang et al. | |
| 2009/0024964 | A1 * | 1/2009 | Kantamneni ................ | 715/854 |
| 2010/0045933 | A1 * | 2/2010 | Eberl et al. .................... | 351/210 |

(Continued)

FOREIGN PATENT DOCUMENTS

KR    10-2000-0056563 A    9/2000

(Continued)

*Primary Examiner* — Joseph Haley
*Assistant Examiner* — Emily Frank
(74) *Attorney, Agent, or Firm* — Rabin & Berdo, P.C.

(57) ABSTRACT

A method for tracking a user's gaze point using a mobile terminal is provided. The method includes detecting the user's eye area from a camera that is mounted in the mobile terminal and selecting reference points of the eye area, detecting a pupil corresponding to an interest area that is obtained from the reference points, generating a first virtual grid of the eye area using a pickup image of a gaze point of the pupil corresponding to each corner of the display and generating a second virtual grid having the same division areas as those of the first virtual grid in the display, and mapping a position of the pupil within the second virtual grid area corresponding to a position of the pupil within the first virtual grid.

12 Claims, 6 Drawing Sheets

(56) References Cited

U.S. PATENT DOCUMENTS

| | | |
|---|---|---|
| 2011/0310238 A1 | 12/2011 | Koh et al. |
| 2013/0002846 A1* | 1/2013 | De Bruijn et al. ............... 348/78 |
| 2013/0154913 A1* | 6/2013 | Genc et al. .................... 345/156 |
| 2013/0176533 A1* | 7/2013 | Raffle et al. ................... 351/209 |

FOREIGN PATENT DOCUMENTS

| | | |
|---|---|---|
| KR | 10-2010-0083044 A | 7/2010 |
| KR | 10-2012-0006819 A | 1/2012 |
| KR | 10-2012-0127790 A | 11/2012 |

* cited by examiner (A)

(B)

(C)

METHOD AND APPARATUS FOR TRACKING USER'S GAZE POINT USING MOBILE TERMINAL

CROSS-REFERENCE TO RELATED APPLICATION

This application claims priority to and the benefit of Korean Patent Application No. 10-2013-0045041 filed in the Korean Intellectual Property Office on Apr. 23, 2013, the entire contents of which are incorporated herein by reference.

BACKGROUND OF THE INVENTION (a) Field of the Invention

The present invention relates to a method and apparatus for tracking a user's gaze point using a mobile terminal. More particularly, the present invention relates to a method and apparatus for tracking a gaze point of a user who gazes at a display of a mobile terminal.

(b) Description of the Related Art

With recent improvements in computer technology providing a wide range of new contents, a desire to conveniently use them is increasing. Therefore, to provide a more user friendly interface beyond interaction using general input interface equipment such as a keyboard and a mouse, research using various body information has been actively performed. Particularly, an interface using eye motion tracking can easily transfer an intention and perform efficient interaction even with a few motions, and thus function as a human friendly interaction means.

Initial researches that are related to user's gaze position tracking have tracked the user's gaze position using infrared ray light due to a limitation in performance of an existing camera. Because such a gaze position tracking system grasps a position of eyes in an entire face, accurately projects light to eyes, and calculates a relationship of light that is reflected from a periphery of a pupil and an iris, the gaze position tracking system was formed under an assumption that it fixes a user's motion in which only the pupil is moved.

Subsequently, as camera performance has been greatly improved and cameras are now formed with a small size, research on methods that do not use infrared rays light has been performed to solve a problem according to a user motion. Most of such research has extracted a plurality of characteristic points (eye, nose, and mouth) within the user face and has recognized the user's motion through a geometrical change between the characteristic points.

A distance between a user and a portable terminal display is an average of 35 cm (31.5 cm when Web searching), and when using the portable terminal, a case in which the user's image that is input to a front surface camera is not an entire face area is very frequent. Therefore, the above methods are inappropriate as a motion correction method for using a portable terminal. Conventionally, by determining a gaze position by extending a gaze that is calculated through motion correction to a monitor, a problem of generating a large error at an actual gaze position from a small error that is started from pupil motion detection has occurred.

Background technology of the present invention is disclosed at Korean Patent Laid-Open Publication No. 10-2000-0056563 (laid-open at Sep. 15, 2000).

SUMMARY OF THE INVENTION

The present invention has been made in an effort to provide a method and apparatus for tracking a user's gaze point using a mobile terminal that can track it using a camera that is mounted in the mobile terminal and that can track a gaze position in real-time using a virtual grid.

An exemplary embodiment of the present invention provides a method of tracking a gaze point of a user gazing at a display of a mobile terminal, the method including: detecting the user's eye area from a camera that is mounted in the mobile terminal and selecting reference points of the eye area; detecting a pupil corresponding to an interest area that is obtained from the reference points; generating a first virtual grid of the eye area using a pickup image of a gaze point of the pupil corresponding to each corner of the display and generating a second virtual grid having the same division areas as those of the first virtual grid in the display; and mapping a position of the pupil within a second virtual grid area corresponding to a position of the pupil within the first virtual grid.

The method may further include changing a position or a size of the first virtual grid by detecting position movement of the eye area in a screen area of the display.

The reference points of the eye area may include an eye head point and an eye tail point.

The generating of a first virtual grid may include determining a size of the width and the height of the first virtual grid using a difference value of a gaze position of two lateral corners of the corners and a difference value of a gaze position of two vertical corners.

The generating of a first virtual grid may include operating a depth between the mobile terminal and the pupil using a value x, which is a half of a difference value of a gaze position of the two lateral corners with the following equation:

$$\text{depth} = \frac{s}{x}\text{eyeball}_{radius} - \text{eyeball}_{radius}$$

where s indicates a half of a width of the display, and $\text{eyeball}_{radius}$ indicates an average radius of an eyeball.

The changing of a position or a size of the first virtual grid may include: changing a position or a size of the first virtual grid by detecting a three-dimensional position change of the eye area; and changing a size of the first virtual grid using a distance between the mobile terminal and the eye area that is obtained from a distance between reference points of the eye area and moving a position of the first virtual grid using a two-dimensional position change of the eye area in the screen area.

Another embodiment of the present invention provides an apparatus for tracking a gaze point of a user gazing at a display of a mobile terminal, the apparatus including: an eye area detector that detects the user's eye area from a camera that is mounted in the mobile terminal, that selects reference points of the eye area, and that detects a pupil corresponding to an interest area that is obtained from the reference points; a grid generator that generates a first virtual grid of the eye area using a pickup image of a gaze point of the pupil corresponding to each corner of the display and that generates a second virtual grid having the same division areas as those of the first virtual grid in the display; and a gaze point mapping processor that maps a position of the pupil within a second virtual grid area corresponding to a position of the pupil within the first virtual grid.

The apparatus may further include a position detector that changes a position or a size of the first virtual grid by detecting a position change of the eye area in a screen area of the display.

DETAILED DESCRIPTION OF THE EMBODIMENTS

The present invention will be described more fully hereinafter with reference to the accompanying drawings, in which exemplary embodiments of the invention are shown.

Figure 1:
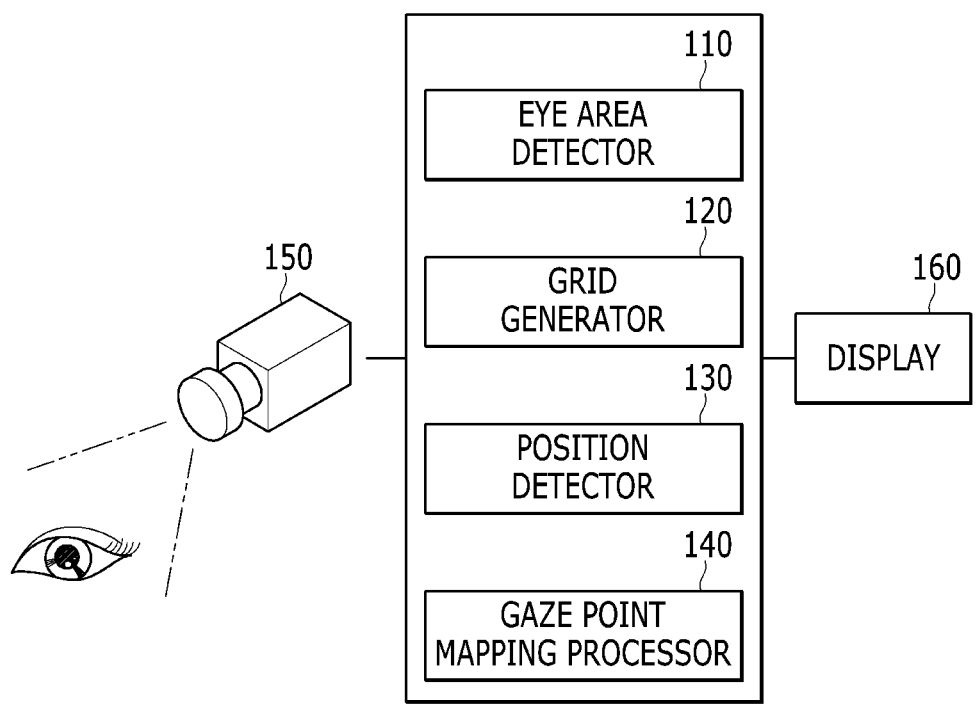
FIG. 1 is a schematic diagram of a user's gaze point tracking apparatus using a mobile terminal according to an exemplary embodiment of the present invention.

FIG. 1 is a schematic diagram of a user's gaze point tracking apparatus using a mobile terminal according to an exemplary embodiment of the present invention. A gaze point tracking apparatus 100 according to an exemplary embodiment of the present invention tracks a gaze point of a user who gazes at a display 160 of a mobile terminal, and includes an eye area detector 110, a grid generator 120, a position detector 130, and a gaze point mapping processor 140.

The eye area detector 110 detects the user's eye area from a camera 150 that is mounted in a mobile terminal, selects reference points of the eye area, and detects a pupil corresponding to an interest area that is obtained from the reference points.

The grid generator 120 generates a first virtual grid of the eye area using a pickup image of a gaze point of the pupil corresponding to each corner of the display 160, and generates a second virtual grid having the same division areas as those of the first virtual grid in the display 160.

The gaze point mapping processor 140 maps a position of the pupil with one-to-one within a second virtual grid area corresponding to a position of the pupil within the first virtual grid.

When there is no position movement of an eye area, mapping is performed in a present state, but when there is a position movement of an eye area, it is detected and a position or a size of the first virtual grid should be changed.

Therefore, before gaze point mapping, the position detector 130 detects a position movement of the eye area in a screen area of the display 160 and changes a position or a size of the first virtual grid. Accordingly, when a position movement of an eye area is detected, by moving a first virtual grid or adjusting a size of a first virtual grid to correspond thereto, gaze point mapping can be performed in real-time.

Figure 2:
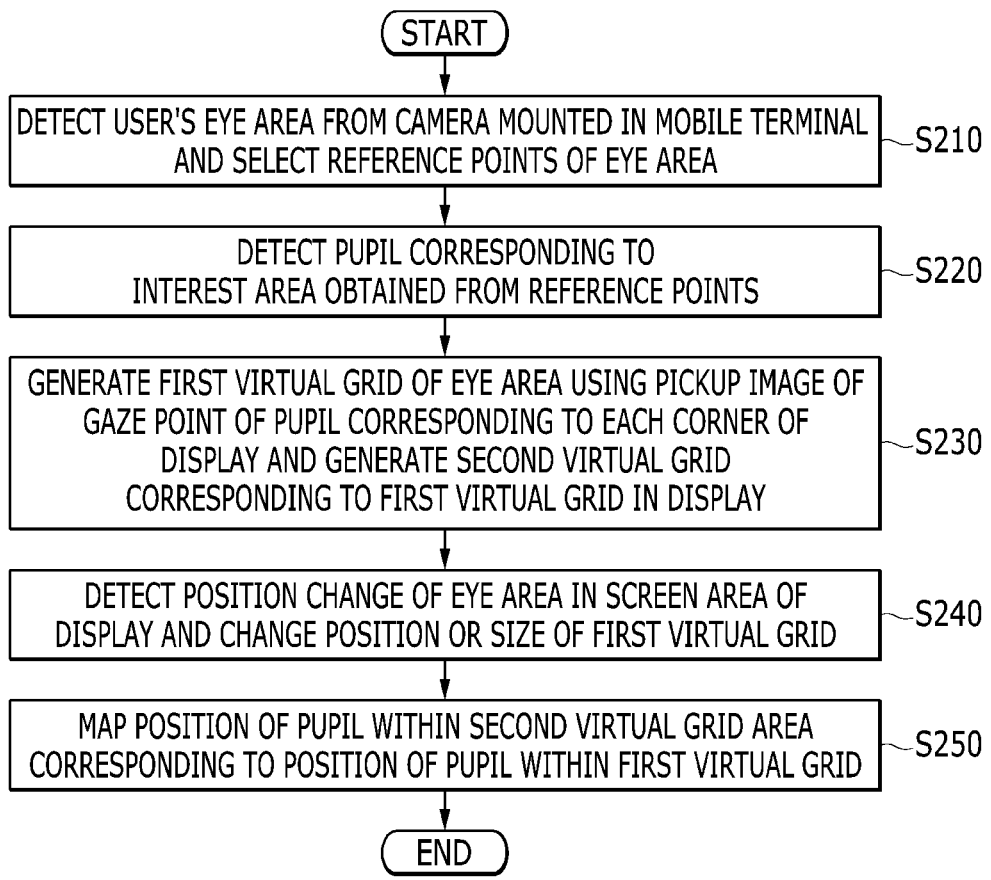
FIG. 2 is a flowchart illustrating a method of tracking a user's gaze point using the user's gaze point tracking apparatus of FIG. 1.

FIG. 2 is a flowchart illustrating a method of tracking a user's gaze point using the user's gaze point tracking apparatus of FIG. 1. Hereinafter, a method of tracking a user's gaze point using a mobile terminal according to an exemplary embodiment of the present invention will be described in detail with reference to FIGS. 1 and 2.

First, the eye area detector 110 detects the user's eye area from the camera 150 that is mounted in a mobile terminal, and selects reference points of the eye area (S210).

An exemplary embodiment of step S210 is as follows. First, the eye area detector 110 initially grasps the user's eye position using a difference image of the user's blink, and stores this as a reference template. The eye area detector 110 continues to track the user's eye position through template matching of the generated reference template and a present input image.

Next, the eye area detector 110 detects an eye area in which noise is removed through a morphology operation and binarization through an iterative threshold in a detected area within a present input image through template matching. The eye area detector 110 searches for end points of an x-axis, i.e., an eye head point and an eye tail point in the detected eye area, and selects this as a reference point.

Figure 3:
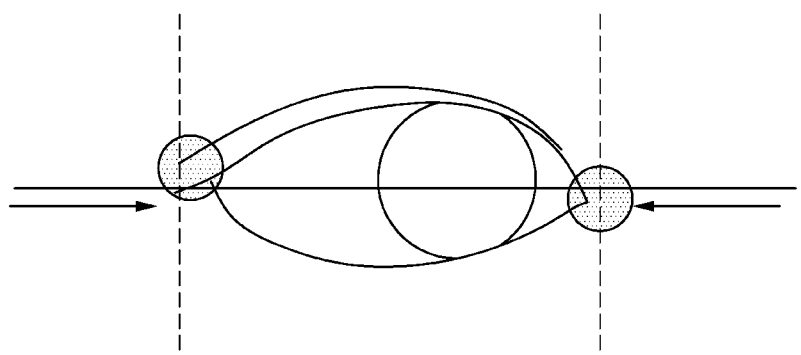
FIG. 3 is a diagram illustrating an example of selecting reference points of an eye area at step S210 of FIG. 2.

FIG. 3 is a diagram illustrating an example of selecting reference points of an eye area at step S210 of FIG. 2. This selects an eye head point and an eye tail point as a reference point. Thereafter, the eye area detector 110 measures a Y-axis position of the selected two reference points and determines an average point thereof as a reference line.

Thereafter, the eye area detector 110 detects a pupil corresponding to an interest area that is obtained from the reference points (S220).

When measuring a human body, an Oriental's eye is 3 cm wide and 1-1.5 cm high. In the present exemplary embodiment, a ratio of a width size and a height size of an interest area is determined to be 3:1.5, and an interest area is set through the ratio. That is, an interest area sets an average coordinate of an eye head point and an eye tail point as a center coordinate, and is formed with the above-described random width and height ratio. When using an interest area, a calculation cost for finding a pupil corresponding to an eye center can be reduced, and a detection error by personal ornaments (glasses) can be reduced. When using a previously known oval detection technique within such an interest area, a pupil can be detected.

After searching for a pupil, a first virtual grid of an eye area and a second virtual grid of a display area are generated. Two virtual grids have the same division area (e.g., division areas of 45 wide×4 long) and have different sizes.

For this purpose, the grid generator 120 generates a first virtual grid of the eye area using a pickup image of a gaze point of the pupil corresponding to each corner (4 corners) of the display 160, and generates a second virtual grid having the same division areas as those of the first virtual grid in the display 160 (S230).

Step S230 includes a process of generating a virtual grid in front of an eye area that is photographed from a camera viewpoint and a process of generating a virtual grid on a display screen area. For this purpose, step S230 enables a corresponding user to gaze at the outermost side (4 vertices) of the display 160 when the user's pupil detection is complete at step S220, and thus determines a first size and a position of a first virtual grid.

Figure 4:
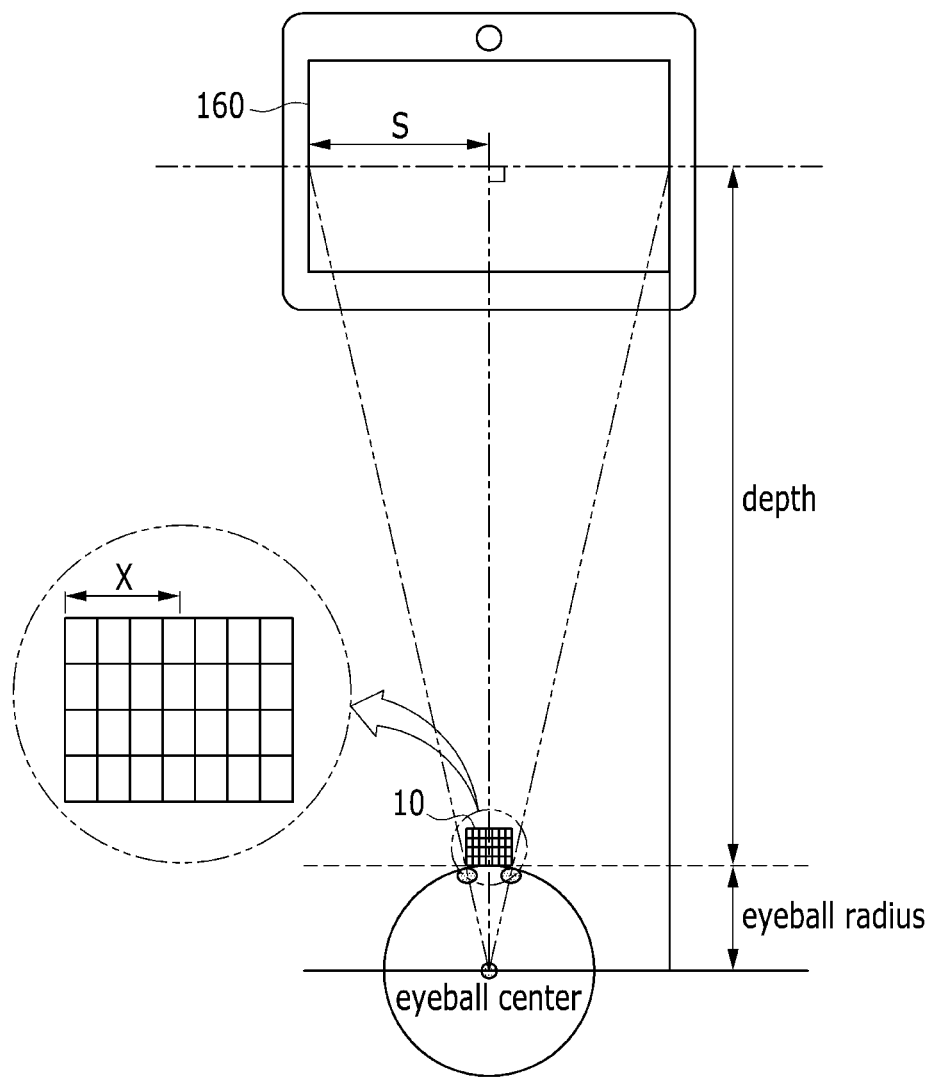
FIG. 4 is a schematic view illustrating generation of a first virtual grid of an eye area at step S230 of FIG. 2.

FIG. 4 is a schematic view illustrating generation of a first virtual grid of an eye area at step S230 of FIG. 2. FIG. 4 illustrates a state in which the user's eyeball views the display 160 and two-dimensionally illustrates a form of the display 160, and a first virtual grid 10 for convenience of description.

Here, a depth between the mobile terminal and the pupil may be operated by Equation 1 using a value x, which is a half of a difference value of a gaze position of two corners of the left and the right.

$$\text{depth} = \frac{s}{x}\text{eyeball}_{radius} - \text{eyeball}_{radius} \quad \text{(Equation 1)}$$

Equation 1 is determined by x: eyeball$_{radius}$=s: (depth+eyeball$_{radius}$)

where s indicates a half of a width of the display, and the $eyeball_{radius}$ indicates an average radius of an eyeball. An average radius of the eyeball is generally 12 mm. In this way, s and $eyeball_{radius}$ are previously known values, and x is an unknown value.

In the present exemplary embodiment, a value x of Equation 1 can be obtained using each photographing image of a gaze point of a pupil when the user gazes at four corner points of the outermost side of the display 160. Here, the value x can be obtained as a reliable value through a gaze point studying process for four corners.

In order to obtain the value x, the camera 150 should have data about a size that a pixel actually represents on a separation distance basis from an object. For example, when converting a pixel distance between pupil pixel points of two corner points of the left and the right to an actual distance, the value x may be obtained. Further, when converting a pixel distance between pupil pixel points of two corner points of the upper side and the lower side to an actual distance, a y value may be obtained.

In this way, at step S230, the grid generator 120 may determine a width size x and a height size y of the first virtual grid from a difference value of a gaze position of two lateral corners of four corners and a difference value of a gaze position of two vertical corners of four corners.

Here, when a size x is determined, a depth of Equation 1 may be known. Such a depth corresponds to an initial distance between a pupil portion that passes through the foregoing gaze point studying process and a mobile terminal.

In this way, after a grid area is defined, the position detector 130 detects a position movement of the eye area in a screen area of the display 160 and changes a position or a size of the first virtual grid (S240).

After a grid area is defined through gaze point studying, when there is no user's motion, a position of an eye area is not changed, and step S250 may be immediately performed. Otherwise, by detecting a position change of an eye area, a size or a position of the first grid area corresponding thereto is adjusted.

That is, when there is no position movement of an eye area, a position change or a size change of the first virtual grid is not performed, and the process continues at the gaze point mapping step of step S250. That is, because the user's face does not move, a position of an eye area is not moved, and when an internal pupil, i.e., only gaze moves, it is determined whether a point at which a pupil is presently positioned exists in which sub-area within the first grid area by tracking the pupil, and a gaze point of a corresponding sub-area within a second grid area corresponding to the sub-area is mapped.

However, as the user's face moves, when a position movement of an eye area is detected, a position or a size of the first virtual grid should be changed to correspond to a position movement. Here, the position detector 130 detects a three-dimensional position change of the detected eye area and changes a position or a size of the first virtual grid.

That is, the position detector 130 detects the user's position based on a mobile terminal and corrects a motion through the detected position. This is because a gaze position changes when the user moves a face thereof to the right side, the left side, the upper side, and the lower side, and a correction process of the gaze position is necessary.

Figure 5:
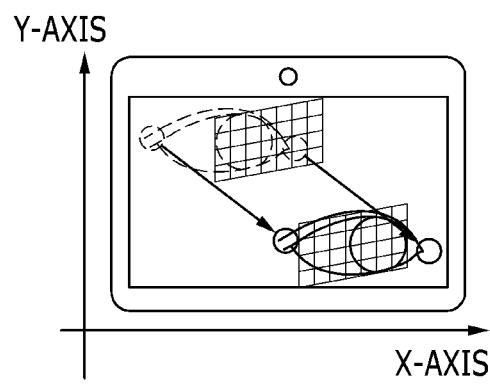
FIG. 5 is a schematic view illustrating step S240 of FIG. 2.
Figure 5:
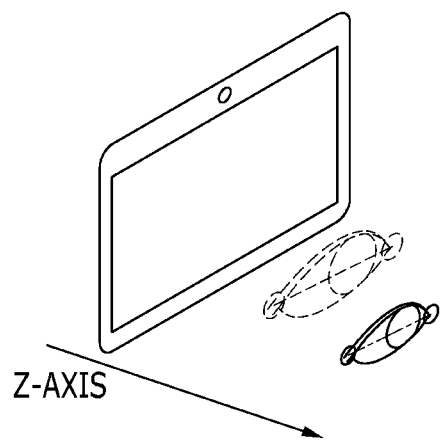
Figure 5:
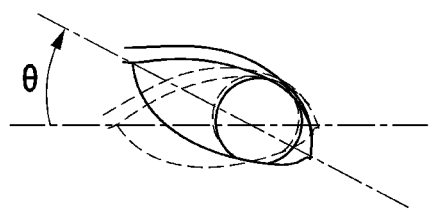

FIG. 5 is a schematic view illustrating step S240 of FIG. 2. FIG. 5(a) illustrates an example of moving a position of the first virtual grid using a two-dimensional position change (displacement of x and y directions) of the eye area in a screen area of the display 160 based on a mobile terminal. FIG. 5 illustrates a case in which an eye area moves from an upper end portion of the left side to a lower end portion of the right side on a screen, and a lower end area of the right side of the first virtual grid is moved to a pupil area portion to correspond to a position of an eye area on a display to correspond thereto.

Here, a position change of the eye area may be measured through a position change of two reference points, and a gaze position may be corrected according to the user's motion when a position of a virtual grid moves based on the position change.

FIG. 5(b) illustrates a case in which a displacement of a z-axis direction of the eye area is detected in a screen area of the display 160. In the present exemplary embodiment, by detecting a depth change of the eye area, a size of a first virtual grid may be changed. When the user's eye approaches a mobile terminal, a size of a virtual grid zooms in, and when the user's eye recedes from a mobile terminal, a size of a virtual grid zooms out.

For this purpose, a size of the first virtual grid is changed using a distance between the mobile terminal and the eye area that is acquired from a distance between two reference points (eye head point, eye tail point) of the eye area. That is, a size of the first virtual grid may be changed through a change of a distance between two reference points generating when the user moves.

At step S230, because an initial distance between two reference points is known and an initial depth of Equation 1 is known, and when comparing a changed distance between two reference points according to the user's motion with an initial distance (when obtaining a ratio of a changed distance and an initial distance), a changed depth value may be obtained from the initial depth. When applying the depth value to Equation 1, operation of an x value, which is a new width to apply to the first virtual grid, can be performed. A new y value may be operated through an x value that is changed in this way. This may use the fact that x and y are formed with a preset random ratio (e.g., 4:7).

In addition, FIG. 5(c) illustrates a case in which the user's face performs a z-axis roll, and by obtaining a position change between reference points with the second law of cosines, a position of a virtual grid may be corrected. The method is as follows.

When first studying, a length of a line segment of a reference line (see FIG. 3) connecting reference points (eye head point and eye tail point) is obtained, and this is set to 0. When a rotation of an eye occurs based on a z-axis, if a line segment center of a previously determined reference line and a line segment center after a rotation correspond, an angle θ between two reference lines occurs. Here, a length of two sides may be obtained (see FIG. 5(c)), thereby obtaining a length of another one side. When knowing lengths of three sides, θ may be obtained using Equation 2 according to the second law of cosines:

$$a^2 = b^2 + c^2 - 2bc \cdot \cos A \Rightarrow \cos A = \frac{b^2 + c^2 - a^2}{2bc} \quad \text{(Equation 2)}$$

where A represents θ to obtain.

Thereafter, by moving a position of the first virtual grid by θ, an error occurring by a rotation of an eye may be corrected.

Thereafter, in a state in which a size or a position of a virtual grid is changed, by tracking a pupil, position mapping between virtual grids is performed. That is, the gaze point mapping processor 140 determines whether a point at which a pupil is presently positioned corresponds to which sub-area within the first virtual grid by tracking a position of a pupil within the eye area, and maps a gaze point position of the pupil to a corresponding sub-area within a second virtual grid area corresponding thereto (S250).

Figure 6:
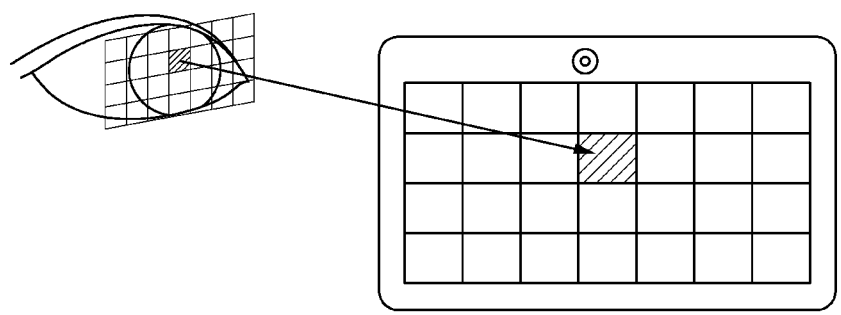
FIG. 6 is a schematic view illustrating step S250 of FIG. 2.

FIG. 6 is a schematic view illustrating step S250 of FIG. 2. The gaze point mapping processor 140 grasps the user's pupil position within a first virtual grid in a state in which a position and a size of the first virtual grid are changed, and performs mapping between second virtual grids of a mobile terminal. It can be determined that mapping is performed at one-to-one at the same position of two virtual grids through FIG. 5, and thus an error is prevented from amplifying and a calculation cost of a gaze position can be saved.

When using an exemplary embodiment of the present invention, a patient (or equivalent thereto) communicating by eye can click a screen of a mobile terminal by eye and directly write a document. In addition, the user's gaze direction turning toward the mobile terminal is detected and detection of gaze direction can be usefully used for start of automatic screen lock and a power saving mode.

As described above, according to the present invention, a user's gaze point can be tracked using a camera that is mounted in a mobile terminal and a gaze position can be easily tracked without a separate calculation cost through one-to-one mapping between grids using an intuitive method of a virtual grid instead of an algorithm requiring a high calculation cost. Further, a mobile terminal does not use additional equipment (e.g., infrared rays) other than a camera and thus a structure thereof is simple and a unit cost of a product can be reduced.

In a method and apparatus for tracking a user's gaze point using a mobile terminal according to the present invention, the user's gaze point can be tracked using a camera that is mounted in the mobile terminal, and a gaze point can be intuitively tracked through one-to-one mapping between grids using a virtual grid.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of tracking a gaze point of a user gazing at a display of a mobile terminal, the method comprising:
    detecting the user's eye area from a camera that is mounted in the mobile terminal and selecting reference points of the eye area;
    detecting a pupil corresponding to an interest area that is obtained from the reference points;
    generating a first virtual grid of the eye area using a pickup image of a gaze point of the pupil corresponding to each corner of the display and generating a second virtual grid having same division areas as division areas of the first virtual grid in the display; and
    mapping a position of the pupil within a second virtual grid area corresponding to a position of the pupil within the first virtual grid.

2. The method of claim 1, further comprising changing a position or a size of the first virtual grid by detecting a position movement of the eye area in a screen area of the display.

3. The method of claim 2, wherein the reference points of the eye area comprise an eye head point and an eye tail point.

4. The method of claim 2, wherein the generating of a first virtual grid comprises determining a size of the width and the height of the first virtual grid using a difference value of a gaze position of two lateral corners of the corners and a difference value of a gaze position of two vertical corners.

5. The method of claim 4, wherein the generating of a first virtual grid comprises operating a depth between the mobile terminal and the pupil using a value x, which is a half of a difference value of a gaze position of the two lateral corners with the following equation:

$$\text{depth} = \frac{s}{x}\text{eyeball}_{radius} - \text{eyeball}_{radius}$$

where s indicates a half of a width of the display, and eyeball$_{radius}$ indicates an average radius of an eyeball.

6. The method of claim 2, wherein the changing of a position or a size of the first virtual grid comprises:
    changing a position or a size of the first virtual grid by detecting a three-dimensional position change of the eye area; and
    changing a size of the first virtual grid using a distance between the mobile terminal and the eye area that is obtained from a distance between reference points of the eye area and moving a position of the first virtual grid using a two-dimensional position change of the eye area in the screen area.

7. An apparatus for tracking a gaze point of a user gazing at a display of a mobile terminal, the apparatus comprising:
    an eye area detector that detects the user's eye area from a camera that is mounted in the mobile terminal, that selects reference points of the eye area, and that detects a pupil corresponding to an interest area that is obtained from the reference points;
    a grid generator that generates a first virtual grid of the eye area using a pickup image of a gaze point of the pupil corresponding to each corner of the display and that generates a second virtual grid having same division areas as division areas of the first virtual grid in the display; and
    a gaze point mapping processor that maps a position of the pupil within a second virtual grid area corresponding to a position of the pupil within the first virtual grid.

8. The apparatus of claim 7, further comprising a position detector that changes a position or a size of the first virtual grid by detecting a position change of the eye area in a screen area of the display.

9. The apparatus of claim 8, wherein the grid generator determines a size of the width and the height of the first virtual grid using a difference value of a gaze position of two lateral corners of the corners and a difference value of a gaze position of two vertical corners.

10. The apparatus of claim 9, wherein the grid generator operates a depth between the mobile terminal and the pupil with the following equation using a value x, which is a half of a difference value of a gaze position of the lateral two corners:

$$\text{depth} = \frac{s}{x}\text{eyeball}_{radius} - \text{eyeball}_{radius}$$

where s indicates a half of a width of the display, and eyeball$_{radius}$ indicates an average radius of an eyeball.

11. The apparatus of claim 8, wherein the position detector changes a position or a size of the first virtual grid by detecting a three-dimensional position change of the eye area, changes a size of the first virtual grid using a distance between the mobile terminal and the eye area that is obtained from a distance between reference points of the eye area, and moves a position of the first virtual grid using a two-dimensional position change of the eye area in the screen area.

12. The apparatus of claim 7, wherein the reference points of the eye area comprise an eye head point and an eye tail point.

* * * * *